US012658726B2

(12) United States Patent
Yang et al.

(10) Patent No.: US 12,658,726 B2
(45) Date of Patent: Jun. 16, 2026

(54) DISCHARGE CIRCUIT

(71) Applicant: TEXAS INSTRUMENTS INCORPORATED, Dallas, TX (US)

(72) Inventors: Qiao Yang, Munich (DE); Stefan Herzer, Marzling (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 705 days.

(21) Appl. No.: 18/162,260

(22) Filed: Jan. 31, 2023

(65) Prior Publication Data

US 2024/0258811 A1 Aug. 1, 2024

(51) Int. Cl.
*H02J 7/90* (2026.01)
*H02J 7/34* (2006.01)
*H02M 3/155* (2006.01)

(52) U.S. Cl.
CPC ................ *H02J 7/90* (2026.01); *H02J 7/345* (2013.01); *H02M 3/155* (2013.01)

(58) Field of Classification Search
CPC ............. H02J 7/90; H02J 7/345; H02M 3/155
USPC ......................................................... 320/166
See application file for complete search history.

(56) References Cited

U.S. PATENT DOCUMENTS

| | | | | |
|---|---|---|---|---|
| 10,833,527 B2 * | 11/2020 | Kudo | ......................... | G05F 3/26 |
| 2022/0190625 A1 * | 6/2022 | Matsuda | ................... | H02J 7/63 |
| 2022/0231529 A1 * | 7/2022 | Yoshikawa | ............... | H02J 7/63 |
| 2023/0291018 A1 * | 9/2023 | Hoshino | ............. | H01M 10/425 |

* cited by examiner

*Primary Examiner* — Nathaniel R Pelton
(74) *Attorney, Agent, or Firm* — Zhenhai Fu; Framl D. Cimino

(57) ABSTRACT

A circuit includes a first transistor coupled between a discharge terminal and a ground terminal. The first transistor has a first control terminal. A resistor is coupled between a power terminal and the first control terminal. A second transistor has a second control terminal coupled to the discharge terminal. A rectifying device is coupled between the resistor and the second transistor.

8 Claims, 6 Drawing Sheets

DISCHARGE CIRCUIT

BACKGROUND

A power supply system can receive power from a power source, and provide a power signal (e.g., a voltage and a current) to a load. The power supply system may include a capacitor at the output to attenuate noise in the power signal, and the capacitor can be charged by the power supply system. In some cases, to transition the load to a low power state or to a disabled state, the power supply system can be disabled, or otherwise can disconnect the load from the power source. However, the capacitor may remain charged and can continue to supply the power signal to the load. Accordingly, the load may be in an unknown or unexpected power state.

SUMMARY

In one example, a circuit includes a first transistor coupled between a discharge terminal and a ground terminal. The first transistor has a first control terminal. A resistor is coupled between a power terminal and the first control terminal. A second transistor has a second control terminal coupled to the discharge terminal. A rectifying device is coupled between the resistor and the second transistor.

DETAILED DESCRIPTION

Figure 1:
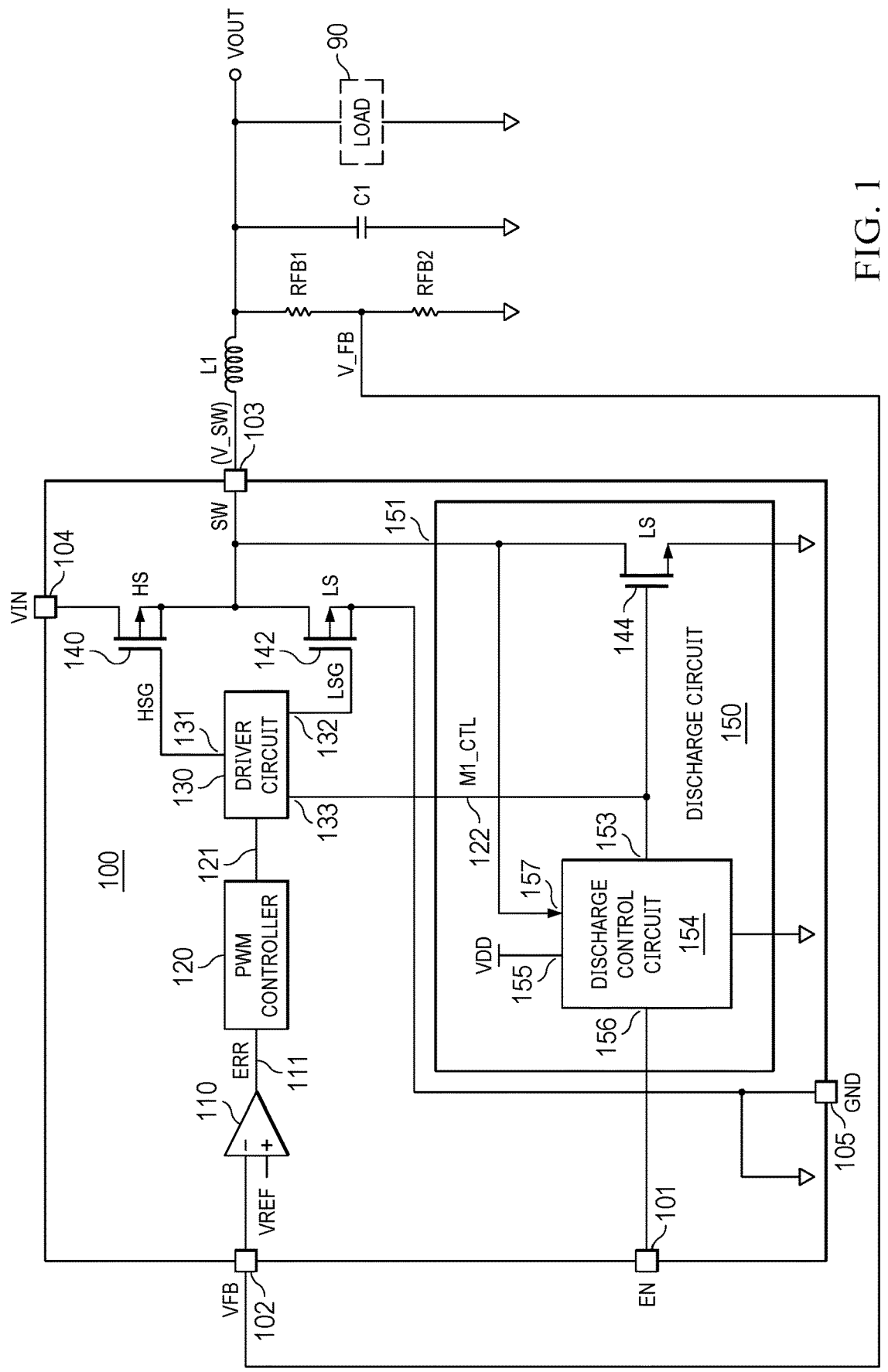
FIG. 1 is a schematic diagram of a power converter including a discharge circuit to discharge a capacitor, in an example.

The same reference numbers or other reference designators are used in the drawings to designate the same or similar (either by function and/or structure) features.

FIG. 1 is a schematic diagram of an example power converter 100 which can be part of a power supply system. In some examples, the power converter 100 may be a switching converter. The power converter 100 may be implemented as, for example, an integrated circuit (IC) on which some of the components of the power converter are fabricated. Other components may be coupled to one or more terminals of the IC. In the example of FIG. 1, the power converter 100 includes terminals such as an enable (EN) terminal 101, a voltage feedback (VFB) terminal 102, a switching (SW) terminal 103, a power terminal 104, and a ground terminal 105. Additional terminals may be provided in other examples. One terminal of an inductor L1 is coupled to the SW terminal 103, and a capacitor C1 is coupled to the other terminal of inductor L1.

The power converter 100 can receive power from a power source (e.g., VIN) via power terminal 104, and supply a power signal to capacitor C1 and a load (e.g., load 90). The capacitor C1 can be part of the power converter 100, part of the power supply system, or external to the power supply system. The power signal can include a voltage and a current. The current can charge capacitor C1 to the voltage VOUT. The current and the VOUT voltage can also be provided to load 90. In examples where the power converter 100 is a switching converter, the power converter 100 can connect the power source VIN to the load 90 and the capacitor C1 in a charging phase of a switching cycle, and disconnect the power source from the load 90 in a discharging phase of the switching cycle. The capacitor C1 can attenuate noise in VOUT, such as switching noise caused by the connection and disconnection of VIN from the load by the power converter 100, which can reduce ripple in VOUT. Also, during the discharging phase, the capacitor C1 can discharge to provide a current to the load 90. The power converter 100 can also be disabled to disconnect VIN from the load 90 to transition the load to a low power state or to a disabled state.

Also, resistors RFB1 and RFB2 are coupled in series between VOUT and ground and form a resistor divider to generate a feedback voltage V_FB to the VFB terminal 102 of the converter. The feedback voltage V_FB is proportional to the output voltage VOUT and, in general, is a scaled down version of VOUT. The power converter 100 uses the feedback voltage V_FB to regulate the output voltage VOUT.

In FIG. 1, the power converter 100 includes an amplifier 110, a pulse width modulation (PWM) controller 120, a driver circuit 130, a high side (HS) transistor 140, a low side (LS) transistor 142, and a LS transistor 144. The amplifier 110 has a positive (+, non-inverting) input and a negative (−, inverting) input. The negative input of the amplifier 110 is coupled to the VFB terminal 102 and thus receives the feedback voltage V_FB. A reference voltage (VREF) is provided to the positive input of the amplifier. The amplifier 110 amplifies the difference between VREF and V_FB to generate an error signal (ERR) 111. The output of the amplifier 110 is coupled to the PWM controller 120. The PWM controller 120 generates a PWM signal 121 having a duty cycle and/or frequency that is based on the magnitude (e.g., voltage) of the error signal ERR 111. The duty cycle can define the durations of the charging phase and the discharging phase in a switching cycle. The output of the PWM controller 120 is coupled to the driver circuit 130.

In the example of FIG. 1, LS transistors 142 and 144 are n-type field effect transistors (NFETs), and the HS transistor 140 is a p-type field effect transistor (PFET), but such transistors can be implemented as other types of transistors in other examples. The driver circuit 130 includes outputs 131 and 132. Output 131 is coupled to the gate of the HS transistor 140 and applies a voltage HSG to the gate of the HS transistor. Output 132 is coupled to the gate of the LS transistor 142 and applies a voltage LSG to the gate of the HS transistor. The drain of the HS transistor is coupled the power terminal 104, and the source of the LS transistor 142 is coupled to the ground terminal 105. The source of the HS transistor 140 is coupled to the drain of the LS transistor 142 and to the SW terminal 103. The driver circuit 130 is a gate driver that, during switching operations, drive the gates of the HS transistor 140 and the LS transistors 142 and 144 to enable or disable the transistors to regulate the magnitude of the output voltage VOUT.

For example, during a charging phase of a switching cycle, the driver circuit 130 enables the HS transistor 140 and disables the LS transistors 142 and 144, and during a discharging phase of the switching cycle, the driver circuit 130 enables the LS transistors 142 and 144 and disables the HS transistor 140. When the HS transistor 140 is enabled, the power source VIN can charge the capacitor C1, and the output voltage VOUT increases. When the LS transistors 142 and 144 are enabled, the capacitor C1 can discharge and provide a current to the load 90. The capacitor C1 can also maintain the output voltage VOUT across the load 90. The amplifier's output error signal 111 is indicative of the magnitude of the output voltage VOUT relative to the reference voltage VREF, and the PWM controller 120 responds to changes in the error signal 111 by adjusting the duty cycle (and the durations of the charging and discharging phases) and/or frequency of the PWM signal 121 to the driver circuit 130. As described above, during switching operation, the driver circuit 130 provides the same driver signal to enable/disable LS transistors 142 and 144 together.

As described above, in some cases, it may be useful to disable the power converter 100 (e.g., by disabling the PWM controller 120 to stop the switching). For example, the load 90 may enter a low powered state or a disabled state, and thus the output voltage VOUT across the load 90 can be reduced to 0V. However, when the switching of the power converter 100 stops, the capacitor C1 may still store charge. The capacitor C1 can discharge to provide a non-zero output voltage VOUT and a current to the load 90. Because the load 90 still receives power, it may or may not be operational. Accordingly, the load 90 can be initially in an unknown or unexpected power state until, for example, the capacitor C1 no longer stores sufficient charge to supply current to the load 90, and/or the output voltage VOUT drops below a certain threshold supply voltage for the load 90. Depending on the current consumption, the discharge time of the capacitor C1 may vary, and the duration of the load 90 in the unknown or unexpected power state may also become unpredictable. All these can introduce unpredictability/uncertainty in the load 90 during the transition to the low powered or disabled state. Such unpredictability/uncertainty may also adversely affect other circuits/systems that interface with the load 90, which is undesirable.

The power converter 100 includes a discharge circuit 150 that can address at least some of the issues described above. The discharge circuit 150 includes a discharge control circuit 154 coupled to the LS transistor 144, which can also be part of the discharge circuit 150. The discharge circuit 150 includes a discharge terminal 151 coupled to the SW terminal 103. The discharge terminal 151 is a control input to the discharge control circuit 154. The discharge control circuit 154 also has a control output 153 coupled to the gate of LS transistor 144.

The discharge circuit 150 can discharge capacitor C1 responsive to the power converter 100 being disabled. The discharge control circuit 154 has a power terminal 155 to receive power from to a power source VDD, which can be a voltage regulator or other circuits that receives power from, for example, the power source VIN, or from the SW terminal 103. The discharge control circuit 154 also has a first control input 156 coupled to the EN terminal 101 of the power converter, and a second control input 157 coupled to the discharge terminal 151 (and SW terminal 103). The power converter 100 is enabled responsive to the EN terminal 101 having a first logic state (e.g., logic high), and is disabled responsive to the enable signal the EN terminal 101 having a second logic state (e.g., logic low). The discharge control circuit 154 can also detect the state of the EN terminal 101 via the first control input 156. Responsive to the EN terminal 101 having the second logic state, the discharge control circuit 154 is enabled. Also, responsive to the EN terminal 101 having the first logic state, the discharge control circuit 154 is disabled. Moreover, the discharge control circuit 154 can detect a voltage of the switching terminal 103, V_SW, via the second control input 157. The V_SW voltage can reflect the output voltage VOUT. Towards the end of the discharge operation, the discharge control circuit 154 can be disabled responsive to the output voltage VOUT falling below a certain threshold, which can indicate that the capacitor C1 is discharged and no longer provides power to the load 90. Such arrangements can reduce or eliminate the power consumption of the discharge control circuit 154.

As to be described below, the discharge circuit 150 can speed up the discharge of capacitor C1 responsive to the power converter 100 being disabled. By speeding up the discharge of capacitor C1, the time in which the capacitor C1 can supply power to the load 90 after the power converter 100 is disabled can be reduced, which can reduce the time in which the load 90 is in an unknown or unexpected power state. Also, during the initial phase of the discharge operation, the discharge circuit 150 can provide a voltage to the LS transistor 144 that has a relatively small variation across process, voltage, and temperature (PVT), and the voltage sets the discharge current. Accordingly, the discharge current and the discharge time can also have a relatively small variation across PVT and can be more predictable. All these can reduce the unpredictability/uncertainty of the load 90 during the transition to the low powered or disabled state.

As described above, the discharge control circuit 154 has a control output 153 coupled to the gate of LS transistor 144, and the driver circuit 130 also has an output 133 coupled to the gate of the LS transistor 144. Thus, both of the driver circuit 130 and the discharge control circuit 154 are able to enable/disable the LS transistor 144, albeit in different operations. Specifically, during the switching operation when the discharge control circuit 154 is disabled, the LS transistor 144 can be controlled by the driver 130 (and the PWM controller 120) as part of the LS transistor of the power converter 100. Also, during the discharge operation when the driver circuit 130 is disabled, the LS transistor 144 can be controlled by the discharge control circuit 154 to discharge the capacitor C1. Compared with a case where a power supply system includes a transistor dedicated to discharge the capacitor C1, the arrangements in FIG. 1 can reduce the footprint of the power converter 100. The LS transistor 144 can also reduce the overall on-resistance of the LS transistors during the discharging phase of a switching cycle. In some examples, the LS transistor 144 can be enabled or disabled independently from the LS transistor 142 (e.g., through the discharge control circuit 154) to support various tests and measurements, such as measuring the on-resistance (Rdson) of the LS transistor 142, and the testing of the discharge control circuit 154.

Figure 2:
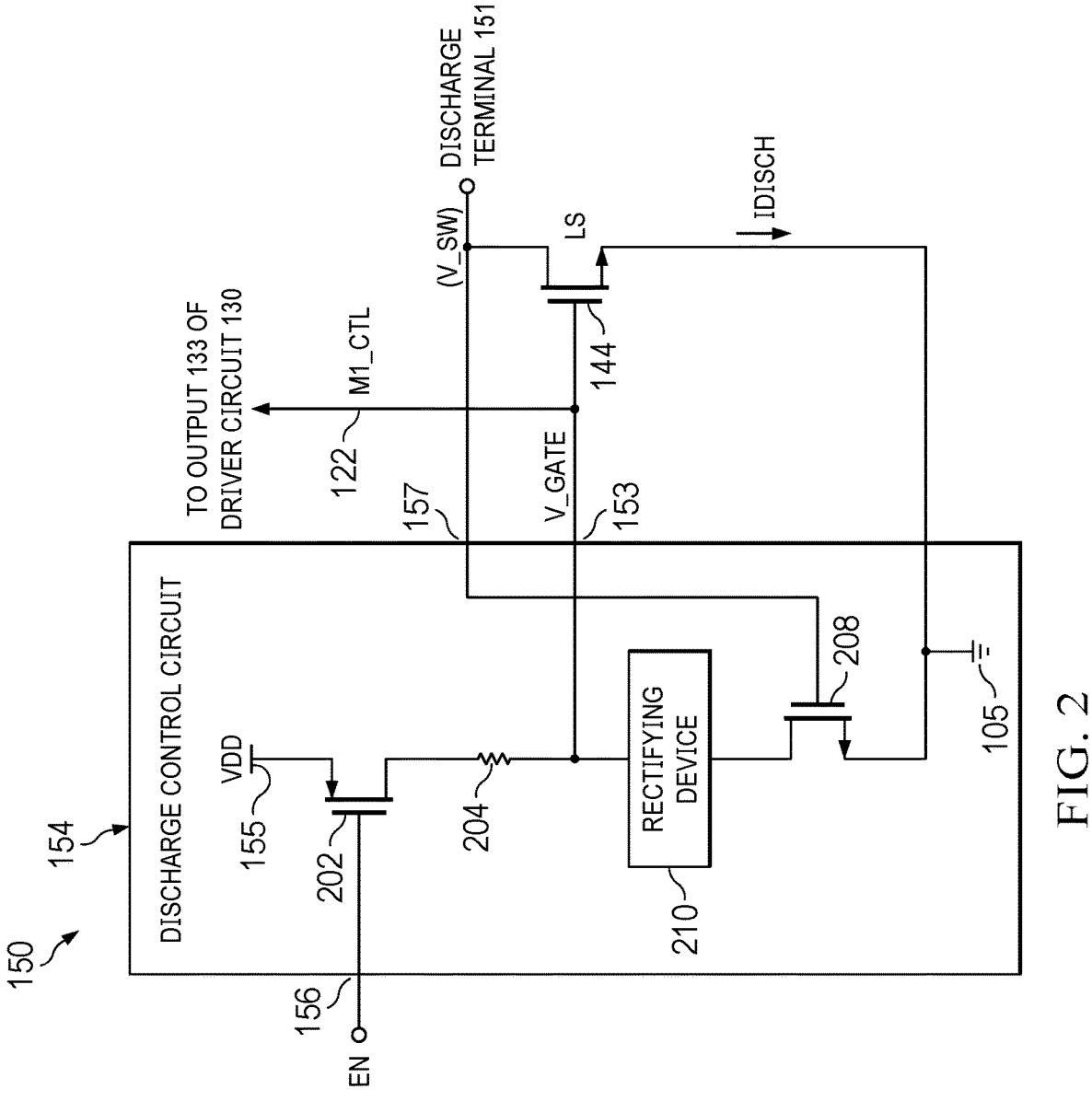
FIG. 2 is a schematic diagram of the discharge circuit of FIG. 1, in an example.

FIG. 2 is a schematic diagram of example internal components of the discharge control circuit 154. The discharge control circuit 154 includes a pull-up transistor 202, a resistor 204, a pull-down transistor 208, and a rectifying device 210 coupled between the power terminal 155 and the ground terminal 105. The pull-down transistor 208 can be an NFET in the example of FIG. 2 but can be implemented as other types of transistors in other examples. Also, the pull-up transistor 202 can be a PFET in this example but can be implemented as other types of transistors in other examples.

The source of the pull-up transistor 202 is coupled to the power terminal 155 to receive a supply voltage from the VDD power source. The supply voltage can be lower than the voltage at the power terminal 104. The gate of the pull-up transistor 202 is coupled to the control terminal 156 (and EN terminal 101). The resistor 204 is coupled between the drain of pull-up transistor 202 and a positive terminal of the rectifying device 210, and the positive terminal is coupled to the control output 153. A negative terminal of the rectifying device 210 is coupled to the drain of the pull-down transistor 208, and the source of the pull-down transistor 208 is coupled to the ground terminal 105. The gate of the pull-down transistor 208 is coupled to the discharge terminal 151 via the second control input 157, which is a first control input to the discharge control circuit 154. The gate of LS transistor 144 is coupled to resistor 204 and to the rectifying device 210, as shown. The output 133 of the driver circuit 130 also couples to the gate of LS transistor 144, as described above.

The gate of the pull-up transistor 202 is coupled to the EN terminal 101 via the first control terminal 156, and the gate of the pull-up transistor 202 is coupled to the second control input 157 (and discharge terminal 151). When the power converter 100 is enabled and the driver circuit 130 is actively driving HS transistor 140 and LS transistors 142 and 144, the EN terminal 101 (and the first control terminal 156) can have a logic high state, which disables the pull-up transistor 202 and disconnects the resistor 204 and the rectifying device 210 from the power terminal 155, and the discharge control circuit 154 is disabled. Accordingly, the discharge control circuit 154 consumes zero (or close to zero) quiescent current when disabled. Also, because no current flows through the resistor 204 and the rectifying device 210, the rectifying device 210 is disabled and no longer drives control output 153, and the gate of the LS transistor 144 can be driven by the driver circuit 130.

On the other hand, when the power converter 100 is disabled, which also disables the driver circuit 130, the EN terminal 101 (and the first control terminal 156) can have a logic low state, which enables the pull-up transistor 202 and connects the resistor 204 and the rectifying device 210 to the power terminal 155. Also, if a first voltage (V_SW in the figures) at the second control input 157 (and discharge terminal 151 and the SW terminal 103), which represents the VOUT voltage, exceeds a threshold voltage of the pull-down transistor 208, the pull-down transistor 208 is also enabled. Accordingly, a current path can be enabled between the power terminal 155 and the ground terminal 105, and a current can flow through resistor 204 and the rectifying device 210, which generates a second voltage (V_GATE in the figures) at the control output 153. The second voltage can enable the LS transistor 144 to discharge the capacitor C1 via the discharge terminal 151 and the SW terminal 103.

The resistor 204 and the rectifying device 210 can set the current and the second voltage. Specifically, the rectifying device 210 can block a current (e.g., in a disabled state) if the voltage across the rectifying device 210 is below a threshold voltage (e.g., a diode threshold voltage, a transistor threshold voltage, etc.). If the second voltage exceeds the threshold voltage, the rectifying device 210 can allow the current to flow through, and the current can increase nonlinearly (e.g., exponentially, quadratically, etc.) with the voltage across the rectifying device 210. Such properties allow the rectifying device 210 to clamp the voltage across the rectifying device 210 at around the threshold voltage. If both pull-up transistor 202 and pull-down transistor 208 have negligible on-resistance and voltage drop (e.g., due to each transistor having a large width/length ratio), the second voltage can be close to (and exceeds) the threshold voltage. The LS transistor 144 can have a threshold voltage lower than or equal to the threshold voltage of the rectifying device 210. Accordingly, with the second voltage exceeding the threshold voltages of both the rectifying device 210 and the LS transistor 144, the LS transistor 144 can be enabled to discharge the capacitor C1 via the discharge terminal 151 and the SW terminal 103.

Also, the current (I) through the rectifying device 210 can be given by:

$$I = \frac{V_{VDD} - V_{TH}}{R} \qquad \text{(Equation 1)}$$

In Equation 1, $V_{VDD}$ represents the voltage at power terminal 155 (provided by the VDD power source), VTH represents the threshold voltage of the rectifying device 210, and R represents the resistance of the resistor 204. In a case where the rectifying device 210 includes a diode-connected transistor, the diode-connected transistor can form a current mirror with the LS transistor 144, and the discharge current IDISCH provided by the LS transistor 144 can be related to the current through the rectifying device 210 (e.g., based on a ratio between the width/length of the rectifying device 210 and the width/length of the LS transistor 144). Accordingly, the discharge current can be defined based on various known parameters, including the voltage at power terminal 155, the threshold voltage of the rectifying device 210, and R represents the resistance of the resistor 204, and the dimensions of the rectifying device 210 and the LS transistor 144. Because the discharge current is well defined, the discharge time for the capacitor C1 can also become more predictable.

At the beginning of the discharge operation, the pull-down transistor 208 can be enabled by a high first voltage (V_SW). As the capacitor C1 is discharged, the first voltage reduces, and the on-resistance of the pull-down transistor 208 increases. Accordingly, the second voltage at the control output 153 (V_GATE) increases, which can further reduce the on-resistance of the LS transistor 144 and speed up the discharging of the capacitor C1 and the reduction of the first voltage. As the first voltage drops to and then below the threshold voltage of the pull-down transistor 208, the pull-down transistor 208 can enter a high impedance state and then become disabled, which stops the flow of current through the resistor 204 and the rectifying device 210. The discharge control circuit 154 can then be disabled. Accordingly, the discharge control circuit 154 also consumes zero (or close to zero) quiescent current towards the end of the discharge operation. In some examples, the rectifying device 210 can include a bypass device that can connect the control output 153 to the resistor 204 when the rectifying device 210 is disabled. Such arrangements can further increase the second voltage (V_GATE) to the voltage of the power terminal 155, and further reduce the resistance of the LS transistor 144, to fully discharge the capacitor C1 and complete the discharge operation.

Figure 3:
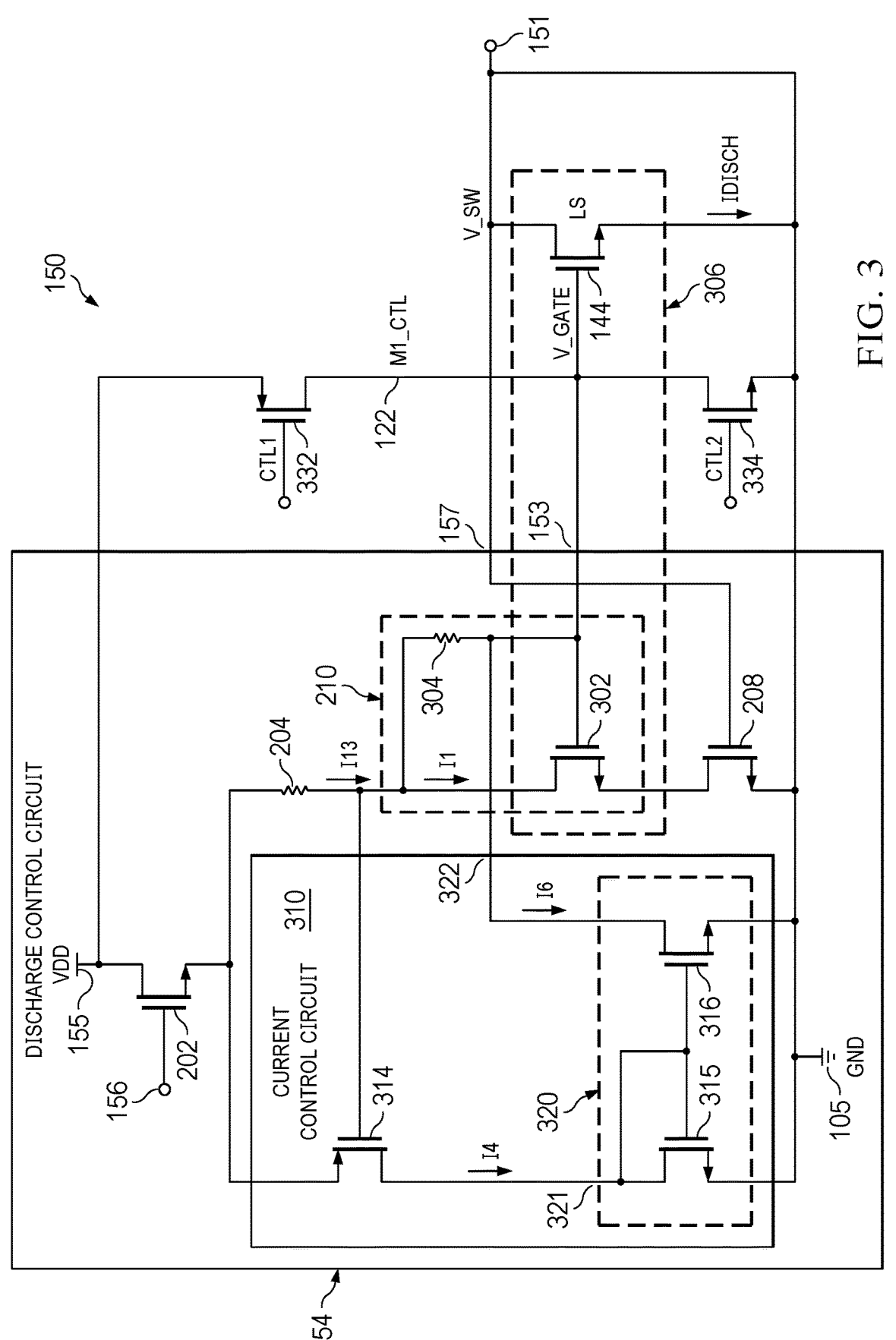
FIG. 3 is a schematic diagram of the discharge circuit of FIG. 1, in another example.

FIG. 3 is a schematic diagram illustrating example internal components of the discharge control circuit 154. Referring to FIG. 3, rectifying device 210 includes a diode-connected transistor 302, which can be an NFET, and a resistor 304 coupled between the drain and gate of the transistor 302. Pull-down transistor 208 is coupled between the source of the transistor 302 and the ground terminal 105. The drain (and gate) of the diode-connected transistor 302 can be a positive terminal of the rectifying device 210 and is coupled to the resistor 204, and the source of the diode-connected transistor 302 can be a negative terminal of the rectifying device 210 and is coupled to the pull-down transistor 208.

The diode-connected transistor 302 allows a current I3 to flow through if the voltage between the gate (and the drain) and the source exceeds a threshold voltage of the transistor 302 and can increase the current quadratically with the drain-source voltage. When the diode-connected transistor 302 conducts the current I1, the transistors 302 and the LS transistor 144 can form a current mirror 306, in which the current I1 can be mirrored through the LS transistor 144 as the discharge current IDISCH. As described above, due to the mirroring of the current, the discharge current IDISCH provided by the LS transistor 144 can be related to the I1 current based on, for example, a ratio between the width/ratio of the transistor 302 and the width/ratio of the LS transistor 144. During this phase of the discharge operation, the discharge current IDISCH can be set by the resistance of resistor 204.

The pull-down transistor 208 can introduce a mismatch in the drain-source voltages between the transistor 302 and the LS transistor 144, which can introduce an error in the mirroring of the current. However, the voltage across the pull-down transistor 208 can be made small by, for example, increasing the width/length ratio of the pull-down transistor 208, limiting the amount of I3 current through the pull-down transistor 208, etc., which can reduce the drain-source voltage mismatch and the resulting current mirroring error.

Also, when the pull-down transistor 208 is disabled (or enters a high impedance state) due to the voltage V_SW falling below the threshold towards the end of the discharging operation, which stops the flow of the current I1, and the transistor 302 is disabled. The resistor 304 can provide a connection between the control output 153 and the resistor 204. With pull-up transistor 202 enabled, the control output 153 can be set at (or close to) the voltage of the power terminal 155 to further reduce the resistance of the LS transistor 144 and to fully discharge the capacitor C1, as described above. During this phase of the discharge operation, the LS transistor 144 operates in a linear region and has the property of a resistor, and the discharge current IDISCH can further increase and is not set by the resistance of the resistor 204 according to Equation 1 above.

In some examples, as shown in FIG. 3, the discharge control circuit 154 can include a current control circuit 310 to regulate the I1 current around a target value, during an initial phase of the discharge operation where the pull-down transistor 208 is enabled and the discharge current IDISCH mirrors the I1 current. Such arrangements can reduce the variations of the I3 current and the discharge current IDISCH across different temperatures, processes, and voltages (at power terminal 155). Also, current control circuit 310 can limit the I3 current to a relatively low value to reduce the drain-source voltage mismatch between the transistor 302 and the LS transistor 144 and the resulting current mirroring error.

Specifically, the current control circuit 310 includes transistors 314, 315, and 316. In this example, the transistor 314 is a PFET and the transistors 315 and 316 are NFETs. The source of transistor 314 is coupled to the power terminal 155. The resistor 204 is coupled between the power terminal 155 and the gate of transistor 314. The transistors 315 and 316 are coupled together to form a current mirror 320 having a mirror input 321 and a mirror output 322. The drain and gate of transistor 315 are coupled together to form a diode-connected transistor, and the drain/gate of the transistor 315 are coupled to the gate of transistor 316. A current I4 that flows through transistor 315 is mirrored as current I6 through transistor 316 in accordance with the mirror ratio of the current mirror 320. In one example, the mirror ratio of current mirror 320 is 1:1 but the mirror ratio can be other than 1:1 in other examples. The mirror input 321 of current mirror is coupled to the drain of transistor 314, and the mirror output 322 is coupled to resistor 304 and to the gates of transistors 302 and LS transistor 144.

The pull-up transistor 202 can be enabled responsive to the first control input 156 having a logic zero state. With the pull-up transistor 202 enabled, a current I13 flows through the resistor 204. The current I13 through the resistor 204 creates a voltage across the resistor 204. If the current I13 is below a current target, that voltage can be below a threshold voltage of the transistor 314 and the transistor 314 is disabled, and the current mirror 320 is also disabled. The current I13 can then flow through the diode-connected transistor 302 as the current I1, and can be mirrored to be the discharge current IDISCH by the current mirror 310 (between the transistor 302 and the LS transistor 144).

On the other hand, if the current I13 exceeds the current target, the voltage across the resistor 204 can exceed the threshold voltage of the transistor 314, and the transistor 314 can be enabled. The enabled transistor 314 can conduct current I4, which is mirrored to the mirror output 322 as current I6 through the current mirror 320. Accordingly, part of the current I13 is steered into the mirror output 322 through the resistor 304, which reduces the current I1 that flows through the diode-connected transistor 302. The discharge current IDISCH can also be reduced accordingly.

Accordingly, the resistor 304, the current mirror 320, and the transistor 314 form a feedback loop to set the current I1 at around a target value during the initial phase of the discharge operation when the pull-down transistor 208 is enabled by the high V_SW voltage across different voltages (at power terminal 155), processes, and temperatures. If current I1 were to increase, the current I13 would increase, and the voltage across the resistor 204 would also increase. The source-gate voltage of the transistor 314 can increase, which increases the current I4. Via the current mirroring by the current mirror 320, the current I6 through the resistor 304 would also increase. The current I1 through the transistor 302 is the difference between currents I13 and I6. If current I13 increases, the feedback loop responds by also increasing the current I6 and thus the current I1 can be maintained at the target value. Similarly, if current I13 were to decrease, the feedback loop would respond by commensurately decreasing current I6 to maintain current I1 at the target value. The feedback loop allows the discharge current and the discharge time to be more predictable, which can reduce the unpredictability/uncertainty of the load 90 during the transition to the low powered or disabled state. Also, the feedback loop can limit the current I1 and reduce the drain-source voltage across the pull-down transistor 208, which can reduce the drain-source voltage mismatch between the transistor 302 and the LS transistor 144 and the resulting current mirroring error.

FIG. 3 also includes transistors 332 and 334 coupled in series between the power terminal 155 (VDD) and the ground terminal 105. In one example, transistors 332 and 334 are part of the driver circuit 130. In another example, transistors 332 and 334 may be part of the discharge circuit 150. Transistor 332 is a PFET, and transistor 334 is an NFET. The drains of transistors 332 and 334 are coupled together and to the gate of LS transistor 144. The driver circuit 130 generates control signal CTL1 for transistor 334 and control signal CTL2 for transistor 332 to enable/disable each respective transistor.

During switching operation, the driver circuit 130 can control the LS transistor 144 by providing the control signals CTL1 and CTL2. For example, during the discharging phase of a switching cycle, the driver circuit 130 can enable the transistor 332 and disable the transistor 334 to connect the gate of the LS transistor 144 to the power terminal 155, which enables the LS transistor 144. Also, during the charging phase of the switching cycle, the driver circuit 130 can disable the transistor 332 and enable the transistor 334 to connect the gate of the LS transistor 144 to the ground terminal 105, which disables the LS transistor 144. Also, when the power converter 100 is disabled, the driver circuit 130 can disable both of transistors 332 and 334 so that the discharge control circuit 154 can set the state of LS transistor 144.

Figure 4:
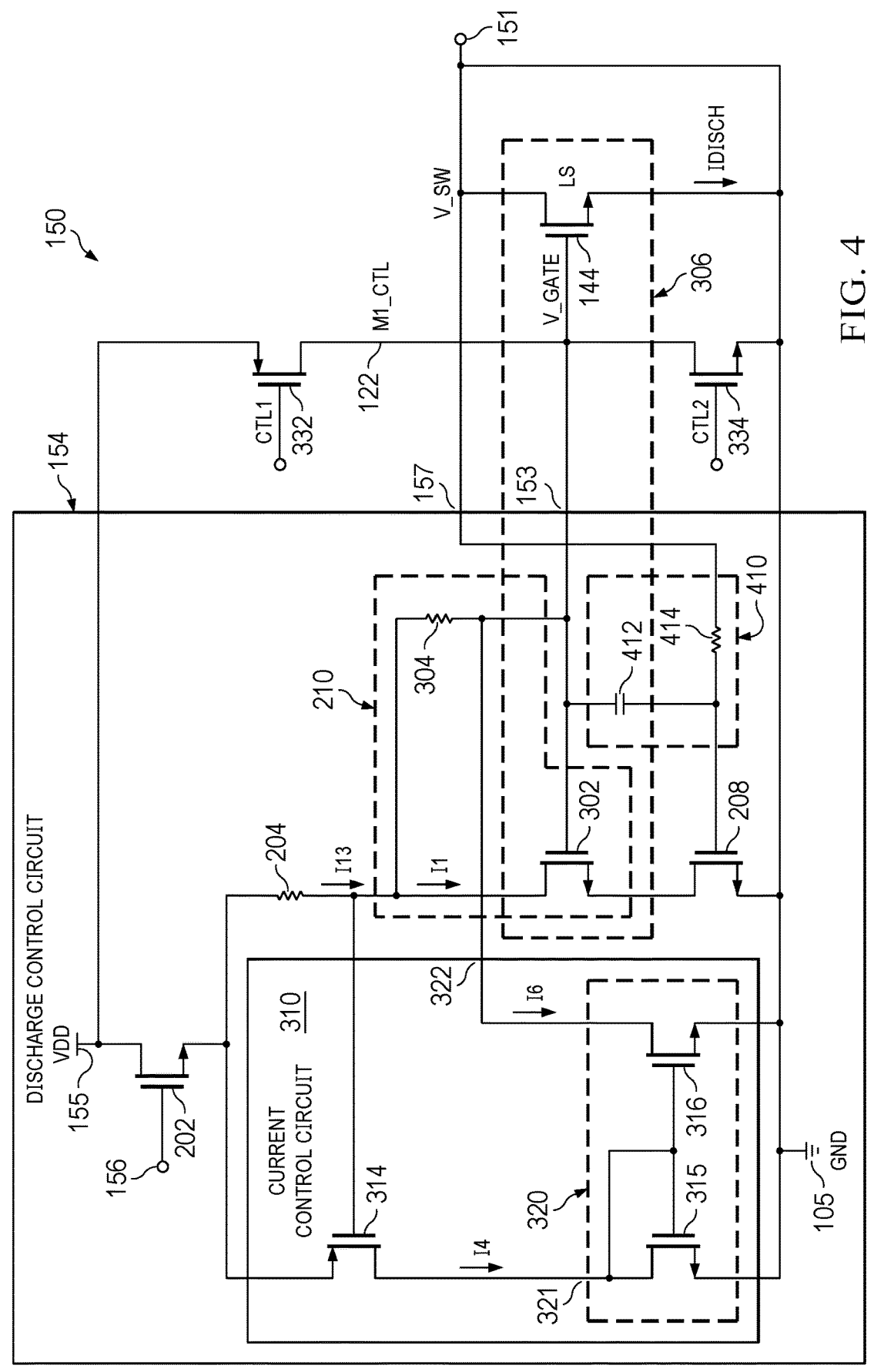
FIG. 4 is a schematic diagram of the discharge circuit of FIG. 1, in yet another example.

FIG. 4 is a schematic diagram of example internal components of discharge control circuit 154. In FIG. 4, discharge control circuit 154 includes a delay circuit 410 coupled between the discharge terminal 151 and the gate of pull-down transistor 208. In the example of FIG. 4, the delay circuit 410 includes a capacitor 412 and a resistor 414. The capacitor 412 is coupled between the gate of the transistor 302 and the gate of the pull-down transistor 208. Resistor 414 is coupled between the gate of the pull-down transistor 208 and the discharge terminal 151.

The delay circuit 410 can delay the propagation of the V_SW signal to the gates of the transistor 302 and the gate of the pull-down transistor 208 to reduce oscillation and improve the stability of the discharge operation. Specifically, as described above, towards the end of the discharge operation where the V_SW voltage drops close to or below the threshold voltage of the pull-down transistor 208, the pull-down transistor 208 can enter a high impedance state or can be disabled, which also disables (or substantially reduces) the flow of current through the transistor 302. The resistors 204 and 304 can connect the gate of the LS transistor 144 to the power terminal 155, and the LS transistor 144 operates like a resistor. Accordingly, the discharge operation can transfer from a current limit mode where the discharge current IDISCH is set by the resistor 204, the transistor 302, and the current control circuit 310 to a resistive mode where the discharge current IDISCH is no longer regulated by the current control circuit 310. During the resistive mode, the discharge current IDISCH can increase rapidly initially and reach a peak, and then reduce as the charge in the capacitor C1 is depleted.

The rapid increase of the discharge current IDISCH can lead to oscillation. Specifically, the inductor L1 (FIG. 1) and the capacitor C1 may form a resonant tank, and the rapid injection of the discharge current IDISCH into the resonant tank can lead to oscillation at the output voltage VOUT (and V_SW). The delay circuit 410 can slow down the transition from the current limit mode to the resistive mode to dampen or reduce the oscillation.

Figure 5:
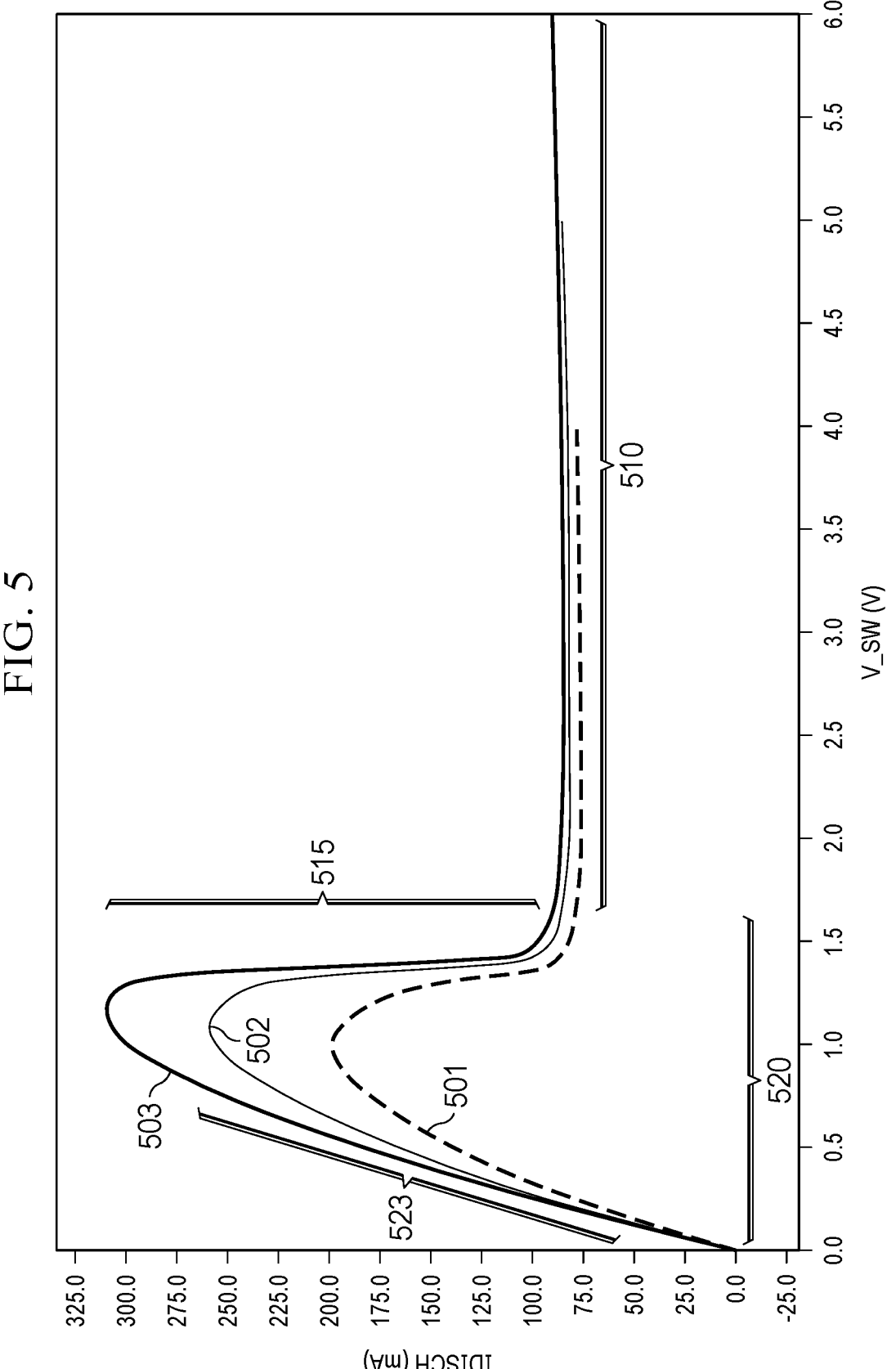
FIGS. 5 and 6 are graphs illustrating current versus voltage waveforms corresponding to the discharge circuits of FIGS. 3 and 4, in an example.

FIG. 5 shows a graph of the relationship between the discharge current IDISCH and the voltage on the SW terminal (V_SW), which also is the voltage on the discharge terminal 151. FIG. 5 shows three graphs 501, 502, and 503. Each graph is for a different voltage at power terminal 155 provided by the VDD power source. The VDD power source voltage for graph 503 is larger than for graph 502, and the VDD power source voltage for graph 502 is larger than the VIN for graph 501.

A relatively flat portion 510 is shown for all three graphs from a higher V_SW down to a V_SW of approximately 1.5V. The flat portion 510 can represent the initial phase of the discharge operation where the discharge circuit 150 operates in the current limit mode. In the current limit mode, the discharge current IDISCH is set by the current control circuit 310 can stay relatively constant across a range of voltages V_SW. The current control circuit 310 can also reduce the variation of the discharge current IDISCH across different VDD power source voltages. In the examples shown in FIG. 5, during the current limit mode the discharge current IDISCH has a range between 75-100 mA.

The portion 510 of each graph illustrates the operations of the discharge circuit 150 in the resistive mode. As described above, towards the end of the discharge operation where the V_SW signal drops close to the threshold voltage of the pull-down transistor 208, the pull-down transistor 208 can be disabled, which also disables the flow of current through the transistor 302. The resistors 204 and 304 can connect the gate of the LS transistor 144 to the power terminal 155, and the LS transistor 144 operates like a resistor. The discharge current can increase rapidly as identified at 515, and is no longer regulated by the current control circuit 310. The discharge current peaks, and then reduces as identified at 523 the charge in the capacitor C1 is depleted.

Figure 6:
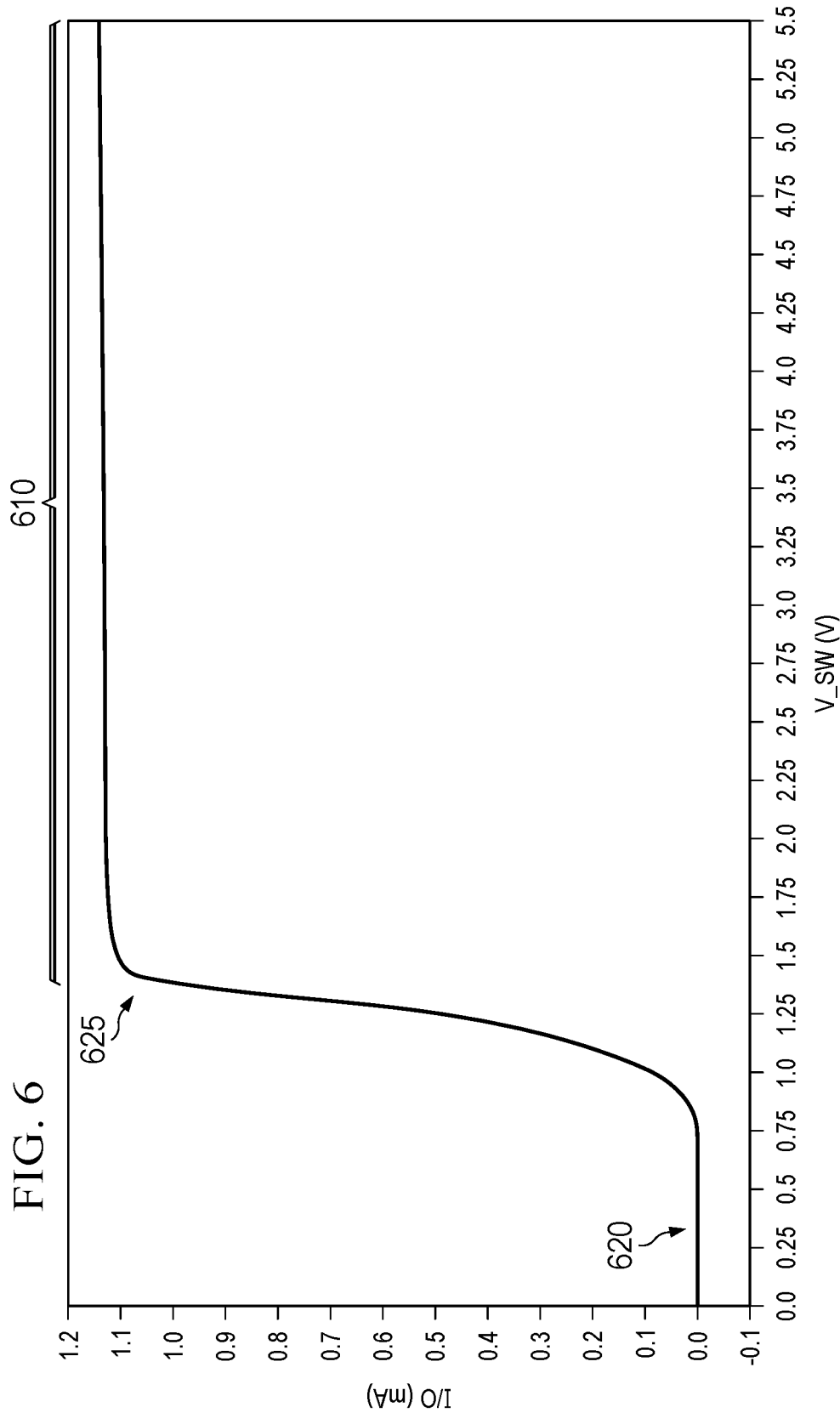

Once the capacitor is fully discharged, little or no current flows through the discharge control circuit 154 and the LS transistor 144. Accordingly, the discharge circuit 150 has no or very little quiescent current. FIG. 6 is a graph of the quiescent current through the pull-up transistor 202 versus the switching terminal voltage V_SW. The switching terminal voltage V_SW decreases during portion 610 as the capacitor C1 discharges. At point 625 (a V_SW of approximately 1.5 V), the quiescent current falls and becomes approximately 0 amperes as identified at point 620.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" or enabled means that the conduction channel of the FET is present and drain current may flow through the FET. References herein to a FET being "OFF" or disabled means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:
   a first transistor coupled between a discharge terminal and a ground terminal, the first transistor having a first control terminal; and
   a resistor coupled between a power terminal and the first control terminal;
   a second transistor having a second control terminal coupled to the discharge terminal; and
   a rectifying device coupled between the resistor and the second transistor.

2. The circuit of claim 1, wherein the resistor is a first resistor, and the circuit further comprises a second resistor coupled between the first resistor and the first control terminal.

3. The circuit of claim 2, further comprising a current control circuit having a current sense terminal and a current control terminal, the current sense terminal coupled to the first resistor, and the current control terminal coupled to the second resistor.

4. The circuit of claim 3, wherein the second resistor is coupled between the current sense terminal and the current control terminal.

5. The circuit of claim 3, wherein the current control circuit includes:
   a current mirror having a mirror input and a mirror output, the mirror output coupled to the current control terminal; and
   a third transistor coupled between the power terminal and the mirror input, the third transistor having a third control terminal coupled to the current sense terminal.

6. The circuit of claim 1, further comprising a delay circuit coupled between the second control terminal and the discharge terminal.

7. The circuit of claim 6, wherein the resistor is a first resistor, and the delay circuit includes:
   a capacitor coupled between the first and second control terminals, and
   a second resistor coupled between the second control terminal and the discharge terminal.

8. The circuit of claim 1, further comprising:
   a third transistor coupled between the power terminal and the discharge terminal, the third transistor having a third control terminal;
   a fourth transistor coupled between the discharge terminal and the ground terminal, the fourth transistor having a fourth control terminal; and
   a driver circuit having a driver input and first, second, and third driver outputs, the first driver output coupled to the third control terminal, the second driver output coupled to the first control terminal, and the third driver output coupled to the fourth control terminal.

* * * * *